(12) United States Patent
Fredholm

(10) Patent No.: US 10,227,250 B2
(45) Date of Patent: Mar. 12, 2019

(54) METHODS AND APPARATUS FOR FORMING A GLASS RIBBON

(71) Applicant: CORNING INCORPORATED, Corning, NY (US)

(72) Inventor: Allan Mark Fredholm, Vulaines sur Seine (FR)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 15/470,251

(22) Filed: Mar. 27, 2017

(65) Prior Publication Data

US 2017/0327401 A1    Nov. 16, 2017

Related U.S. Application Data

(62) Division of application No. 14/334,852, filed on Jul. 18, 2014, now Pat. No. 9,643,872.

(60) Provisional application No. 61/858,295, filed on Jul. 25, 2013.

(51) Int. Cl.
    *C03B 13/04* (2006.01)
    *C03B 13/16* (2006.01)

(52) U.S. Cl.
    CPC .............. *C03B 13/04* (2013.01); *C03B 13/16* (2013.01)

(58) Field of Classification Search
    CPC .................................. C03B 13/04; C03B 13/16
    See application file for complete search history.

(56) References Cited

U.S. PATENT DOCUMENTS

| 1,659,053 A | | 2/1928 | Schutz | |
|---|---|---|---|---|
| 1,772,072 A | | 8/1930 | Drake | |
| 1,816,307 A | | 7/1931 | Von Reis | |
| 1,818,152 A | * | 8/1931 | Nobbe | C03B 13/04 65/101 |
| 1,937,382 A | * | 11/1933 | Cone | C03B 13/16 165/279 |

(Continued)

FOREIGN PATENT DOCUMENTS

| BE | 357209 | 1/1929 |
|---|---|---|
| CN | 2088550 U | 11/1991 |

(Continued)

OTHER PUBLICATIONS

English Translation of CN201480049962.4 Office Action dated Jun. 5, 2017; 8 Pages; Chinese Patent Office.

(Continued)

*Primary Examiner* — Queenie S Dehghan

(57) ABSTRACT

A roll forming apparatus includes at least one forming roll being spaced from a forming body to define a gap. The forming roll includes a working zone portion having a working zone surface with a length extending along a rotation axis of the forming roll and a thermal resistance boundary extending at an acute angle relative to the rotation axis. In further examples, methods include the step of feeding a stream of molten glass through the gap to form a glass ribbon including a formed thickness. The thermal resistance boundary facilitates substantial uniform radial expansion of the working zone surface relative to the rotation axis across the length of the working zone surface in response to heating of the working zone portion by the molten glass.

17 Claims, 6 Drawing Sheets

(56) References Cited

U.S. PATENT DOCUMENTS

| | | | |
|---|---|---|---|
| 2,015,747 A * | 10/1935 | Drake | C03B 13/16 165/90 |
| 3,653,455 A | 4/1972 | Hetteen | |
| 3,655,355 A | 4/1972 | Tissier | |
| 5,833,455 A | 11/1998 | Carr | |
| 5,885,315 A | 3/1999 | Fredholm et al. | |
| 5,970,474 A | 10/1999 | Fredholm et al. | |
| 5,970,747 A | 10/1999 | Fredholm et al. | |
| 6,250,220 B1 | 6/2001 | Sainio et al. | |
| 9,003,835 B2 | 4/2015 | Lock | |
| 9,346,698 B2 | 5/2016 | Poissy | |
| 2004/0093900 A1 | 5/2004 | Fredholm | |
| 2011/0311717 A1 | 12/2011 | Azaki et al. | |
| 2012/0298476 A1 | 11/2012 | Nakayama et al. | |
| 2014/0283554 A1 | 9/2014 | Fredholm | |

FOREIGN PATENT DOCUMENTS

| | | |
|---|---|---|
| CN | 102603193 A | 7/2012 |
| CN | 202465487 U | 10/2012 |
| JP | 58137866 A | 8/1983 |
| JP | 63089421 | 6/1988 |
| JP | 11139837 A | 5/1999 |
| JP | 2005221776 A | 8/2005 |
| WO | 2010141846 | 12/2010 |
| WO | 2012166761 A1 | 12/2012 |
| WO | 2013082212 | 6/2013 |

OTHER PUBLICATIONS

European Patent Office; International Search Report; dated Sep. 29, 2014; pp. 1-5.
International Search Report and Written Opinion PCT/US2014/046976 dated Oct. 7, 2014.
English Translation of JP2016529788 Office Action dated Mar. 27, 2018, Japan Patent Office.
English Translation of TW103124942 Search Report dated Apr. 16, 2018, Taiwan Patent Office.

* cited by examiner

METHODS AND APPARATUS FOR FORMING A GLASS RIBBON

CROSS REFERENCES TO RELATED APPLICATIONS

This application is a Divisional of U.S. patent application Ser. No. 14/334,852, which claims the benefit of priority under 35 U.S.C. § 119 to U.S. Provisional Application Ser. No. 61/858,295, filed on Jul. 25, 2013, the content of which is relied upon and incorporated herein by reference in its entirety.

TECHNICAL FIELD

The present disclosure relates generally to methods and apparatus for forming a glass ribbon and, more particularly, to a methods and apparatus for forming a glass ribbon with at least one forming roll and a forming body spaced to define a glass forming gap.

BACKGROUND

Rolled sheet glass is typically formed using a pair of forming rolls. However, conventional glass roll forming machines that employ forming rolls typically produce glass ribbon that does not have a high precision of dimensional uniformity (e.g. thickness uniformity within +/−0.025 mm) and are unable to form thin glass ribbon below 2-3 mm in thickness. One factor that contributes to this lack of precise thickness control is the non-uniform radial thermal expansion of the forming rolls that are being heated by the stream of molten glass that is formed into the glass ribbon.

FIG. 1 illustrates a schematic view of two conventional forming rolls 101, 103 that are not necessarily drawn to scale for clarity. As show, the forming rolls are spaced from each other to define a glass forming gap 105 for receiving a stream of molten glass 107. The forming rolls 101, 103 may expand radially in a non-uniform manner due to heating from the stream of molten glass 107 (which may be about 1000° C. or higher). For example, as indicated by dashed lines 109a, 109b, heating of the forming rolls 101, 103 by the stream of molten glass 107 can cause a working zone surface of each of the forming rolls to expand radially from the corresponding rotation axis in a non-uniform manner across the length of the working zone surface. The non-uniform radial expansion occurs since the central portions of the forming rolls 101, 103 are being raised to a higher temperature than the corresponding end portions of the forming rolls 101, 103. Due to the non-uniform radial expansion, glass ribbon formed by the forming rolls may consequently have a relatively thin central portion when compared to the outer opposite edges of the glass ribbon.

There is a desire to provide forming rolls that may be used to form a glass ribbon with a thickness profile that is not substantially varied due to radial expansion of the forming rolls when heated.

SUMMARY

The following presents a simplified summary of the disclosure in order to provide a basic understanding of some example aspects described in the detailed description.

In a first aspect, a roll forming apparatus includes a glass feed device for supplying a stream of molten glass and at least one forming roll being spaced from a forming body to define a glass forming gap between the forming roll and the forming body for receiving the stream of molten glass to form a glass ribbon having a formed thickness. The forming roll includes a working zone portion that comprises a working zone surface for engaging the stream of molten glass. The working zone surface includes a length extending along a rotation axis of the forming roll. The forming roll further includes a thermal resistance boundary extending at an acute angle relative to the rotation axis of the forming roll.

In one example of the first aspect, the thermal resistance boundary is configured such that the working zone surface expands radially from the rotation axis in a substantially uniform manner across the length of the working zone surface as a temperature of the working zone portion is increased from a first temperature to a second temperature.

In another example of the first aspect, the thermal resistance boundary comprises a frustoconical end surface of the working zone portion.

In yet another example of the first aspect, the thermal resistance boundary comprises a plurality of bores spaced radially about the rotation axis of the forming roll.

In still yet another example of the first aspect, the thermal resistance boundary comprises a frustoconical groove defined in the forming roll. For example, the frustoconical groove can be provided with one or more strength elements positioned within the groove.

In yet another example of the first aspect, the forming roll includes a cooling passage configured to provide fluid cooling to the forming roll.

In still yet another example of the first aspect, the roll forming apparatus further comprises at least one pair of gap rings, wherein the forming roll and forming body are spaced by the pair of gap rings to define the glass forming gap.

In another example of the first aspect, the pair of gap rings are mounted to the working zone portion of the forming roll.

In yet another example of the first aspect, the acute angle is from about 30° to about 60°.

The first aspect may be carried out alone or with one or any combination of the examples of the first aspect discussed above.

In a second aspect, a forming roll comprises a working zone portion comprising a working zone surface for engaging a stream of molten glass. The working zone surface includes a length extending along a rotation axis of the forming roll. The forming roll further includes a frustoconical groove defined in the forming roll and extending at an acute angle relative to the rotation axis of the forming roll.

In one example of the second aspect, the frustoconical groove is configured such that the working zone surface expands radially from the rotation axis in a substantially uniform manner across the length of the working zone surface as a temperature of the working zone portion is increased from a first temperature to a second temperature.

In another example of the second aspect, the forming roll further comprises a cooling passage configured to provide fluid cooling to the forming roll.

In still another example of the second aspect, the forming roll further comprises at least one gap ring mounted to the working zone portion.

In yet another example of the second aspect, the acute angle is from about 30° to about 60°.

In another example of the second aspect, the frustoconical groove extends a depth into the working zone surface that is within a range of from about 50% to about 85% of a radius of the forming roll.

The second aspect may be carried out alone or with one or any combination of the examples of the second aspect discussed above.

In a third aspect, a method is provided for forming a glass ribbon with at least one forming roll and a forming body spaced to define a glass forming gap between the forming roll and forming body. The forming roll includes a working zone portion comprising a working zone surface having a length extending along a rotation axis of the forming roll. The forming roll further includes a thermal resistance boundary extending at an acute angle relative to the rotation axis of the forming roll. The method comprises the steps of (I) supplying a stream of molten glass and (II) feeding the stream of molten glass through the gap to form a glass ribbon including a formed thickness. The thermal resistance boundary facilitates substantial uniform radial expansion of the working zone surface relative to the rotation axis across the length of the working zone surface in response to heating of the working zone portion by the molten glass.

In one example of the third aspect, the thermal resistance boundary of step (II) is provided as a frustoconical end surface of the working zone portion.

In another example of the third aspect, the thermal resistance boundary of step (II) is provided as a plurality of bores spaced radially about the rotation axis of the forming roll.

In yet another example of the third aspect, the thermal resistance boundary of step (II) is provided as a frustoconical groove defined in the forming roll. For example, the method can include the first step of strengthening the frustoconical groove with a plurality of strength elements positioned within the groove.

In another example of the third aspect, the method further comprises the step of cooling the forming roll with a fluid. For example, the step of cooling can include flowing the fluid through a cooling passage extending along the rotation axis of the forming roll. In another example, the step of cooling can include flowing the fluid against an internal central portion of the forming roll to facilitate substantial uniform expansion of the working zone surface across the length of the working zone surface in response to heating of the working zone portion by the molten glass.

In another example of the third aspect, the step of directing heat to outer peripheral edges of the working zone portion to facilitate substantial uniform expansion of the working zone surface across the length of the working zone surface in response to heating of the working zone portion by the molten glass.

In yet another example of the third aspect, the acute angle is from about 30° to about 60°.

The third aspect may be carried out alone or with one or any combination of the examples of the third aspect discussed above.

BRIEF DESCRIPTION OF THE DRAWINGS

These and other aspects are better understood when the following detailed description is read with reference to the accompanying drawings, in which.

DETAILED DESCRIPTION

Figure 1:
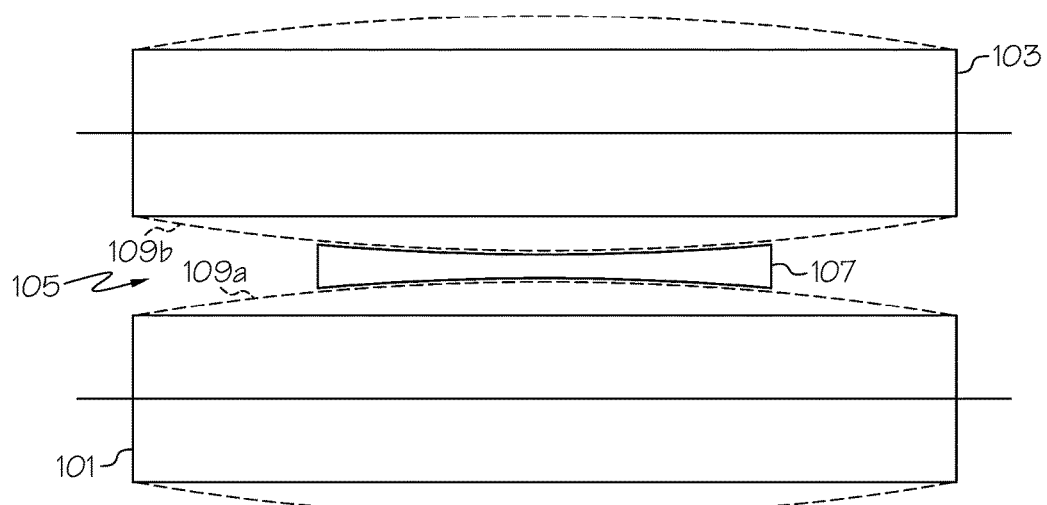
FIG. 1 is a schematic representation depicting the expansion of two conventional forming rolls.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Roll forming apparatus of the disclosure can be useful to produce glass ribbon that may be subsequently separated into glass sheets for various applications. For example, the glass sheets can be used to manufacture liquid crystal displays (LCDs), electrophoretic displays (EPD), organic light emitting diode displays (OLEDs), plasma display panels (PDPs) or other devices.

Figure 2:
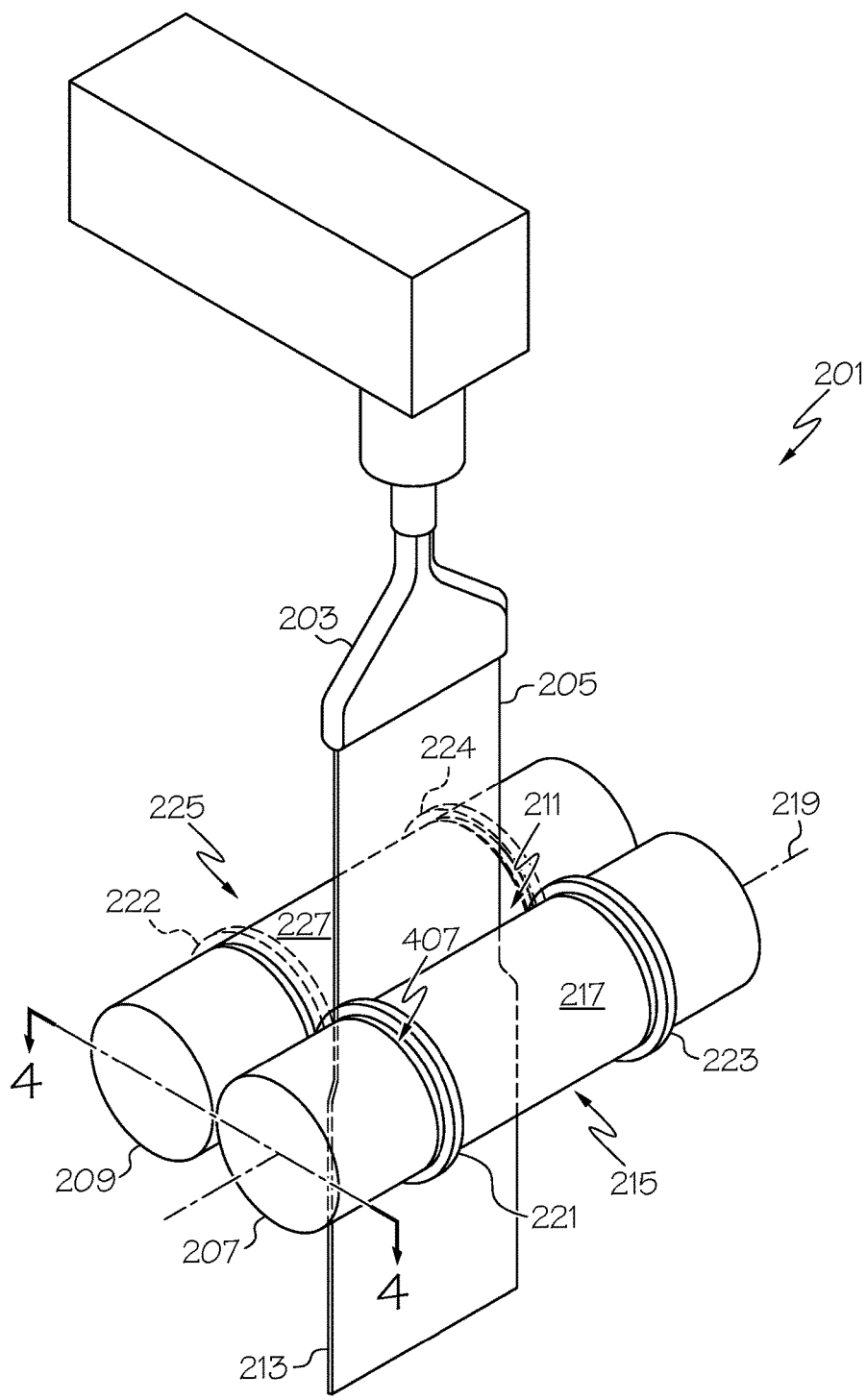
FIG. 2 is a perspective view of an example roll forming apparatus comprising a forming roll spaced from a forming body.
Figure 3:
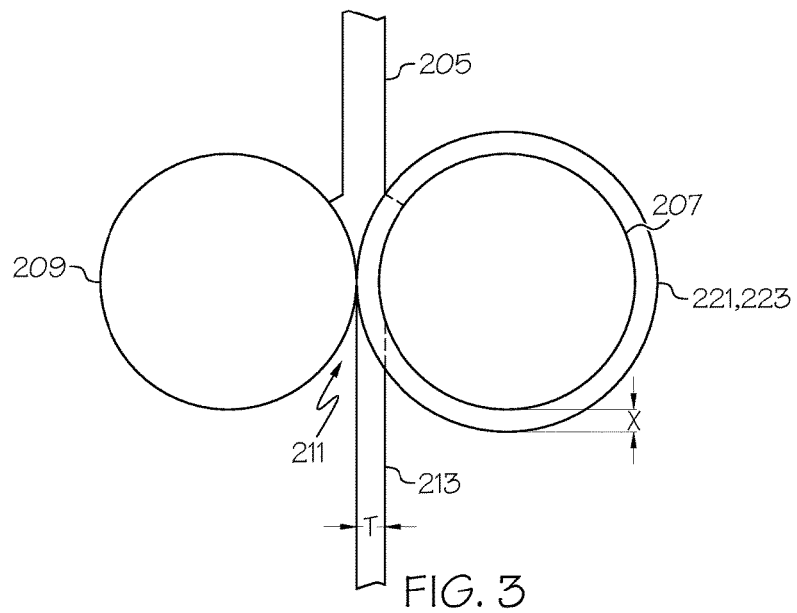
FIG. 3 is an end view of the example roll forming apparatus of FIG. 2.
Figure 4:
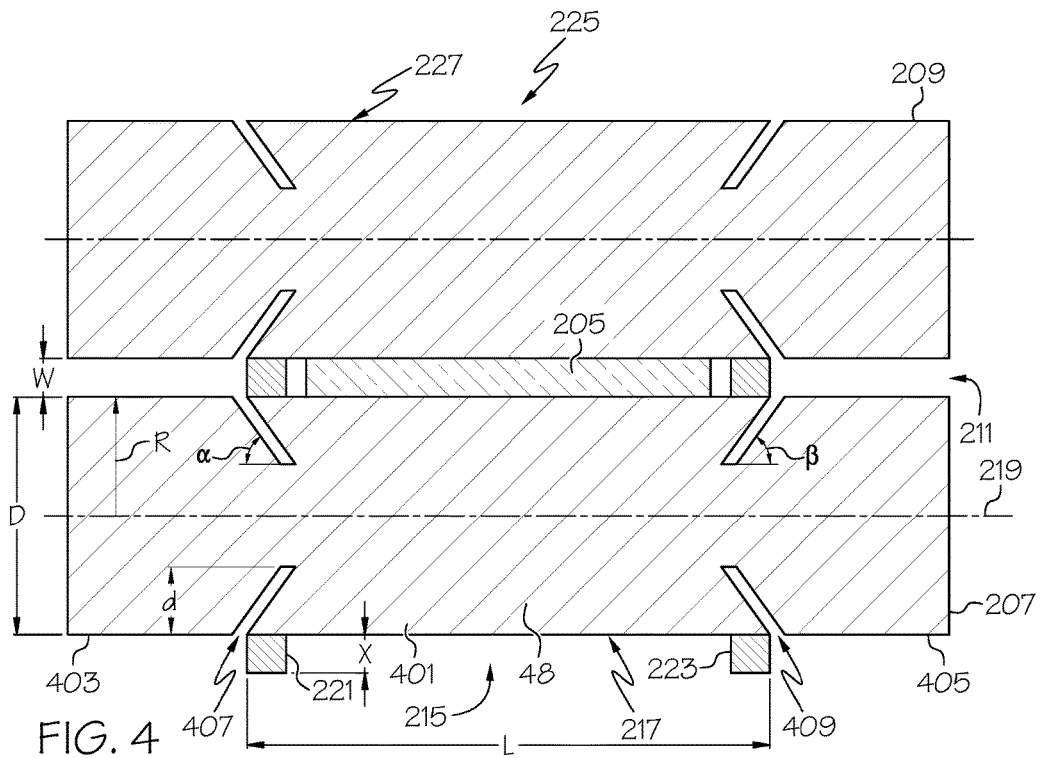
FIG. 4 is a cross-sectional view of the example roll forming apparatus taken along line 4-4 in FIG. 2.

Turning to FIGS. 2-4, one example roll forming apparatus 201 can comprise a glass feed device 203 for supplying a stream of molten glass 205. As shown in FIG. 2, the glass feed device 203 can comprise a fish tail slot feed although other glass feed devices may be provided in further examples. For instance, the glass feed device can comprise a fusion down draw apparatus, a fusion up draw apparatus, a redraw apparatus or other glass feed devices that may supply a stream of molten glass 205.

As shown, the roll forming apparatus 201 comprises at least one forming roll 207 spaced from a forming body 209. The forming roll and forming body can comprise various alternative refractory materials (e.g., ceramic, platinum, etc.). The materials used to manufacture the forming roll and forming body are capable of forming molten glass into a glass ribbon while maintaining the structural integrity of the forming roll and forming body. Moreover, as the forming roll and forming body will be contacting the major surfaces of the formed glass ribbon, the forming roll and forming body should be made from a material that will not damage or otherwise contaminate the major surfaces of the formed glass ribbon. For instance, the forming body can be made from various metallic alloys (e.g., stainless steel, nickel alloys).

The forming roll 207 and forming body 209 can define a glass forming gap 211 between the forming roll 207 and the forming body 209 for receiving the stream of molten glass 205. As shown in FIGS. 2-4, the forming body 209 can comprise a forming roll that may be identical or different than the forming roll 207. Although not shown, further examples may provide the forming body 209 as another member that is not identical or similar to the forming roll 207. For example, the forming body 209 may comprise a member (rotatable or nonrotatable) that may cooperate with the forming roll 207 to define the glass forming gap 211. A glass ribbon 213 can be formed as the stream of molten glass 205 passes through the forming gap 211 between the forming roll 207 and forming body 209. The glass ribbon 213 can be formed with a thickness T (see FIG. 3) that corresponds to a width W (see FIG. 4) of the glass forming gap 211.

As shown in FIGS. 2 and 4, the forming roll 207 includes a working zone portion 215 that comprises a working zone surface 217 for engaging the stream of molten glass 205. The working zone surface 217 may be circular cylindrical although the working zone surface may comprise a polygonal cylindrical configuration or other shaped surface in further examples. Moreover, as shown, the working zone surface 217 has a length L extending along a rotation axis 219 of the forming roll 207. The forming rolls of the disclosure further include at least one thermal resistance boundary extending at an acute angle relative to the rotation axis of the forming roll. For example, as shown in the figures, the at least one thermal resistance boundary can comprise a first thermal resistance boundary extending at an acute angle α relative to the rotation axis of the forming roll and a second thermal resistance boundary extending an another acute angle β relative to the rotation axis of the forming roll. As shown, the acute angles α, β may be identical to one another and facing opposite directions in some examples although the acute angles may be different in further examples. The acute angles α, β may have an absolute value within a range of from about 30° to about 60° although other acute angles may be provided in further examples. Providing acute angles α, β that are opposite to one another can help generate a circumferential dovetail portion with a trapezoidal cross-sectional portion 401 shown in FIG. 4.

As shown in FIG. 4, the first and second thermal resistance boundaries may be provided at respective end portions 403, 405 of the forming roll to allow heat to be more effectively retained within the working zone portion 215. Indeed, the thermal resistance boundary provides a location of relatively higher thermal resistance to heat transfer from the working zone portion, thereby helping inhibit heat transfer out of the working zone portion 215 and into the end portions 403, 405 of the forming roll 207. Meanwhile, the angles α, β of the thermal resistance boundaries can provide desirable thermal distribution characteristics of the working zone portion 215. Indeed, by providing the thermal resistance boundary at opposite acute angles α, β relative to the rotation axis of the forming roll 207, the illustrated circumferential dovetail portion with a trapezoidal cross-sectional portion 401 may be provided such that heat from the stream of molten glass 205 is retained and appropriately distributed throughout the working zone portion 215. The resulting heat distribution in the working zone portion 215 provides a desirable temperature distribution profile that results in substantial uniform radial expansion of the working zone surface 217 relative to the rotation axis 219 across the length L of the working zone surface 217 in response to heating of the working zone portion 215 by the molten glass 205 from a first temperature to a second temperature. Due to the substantial uniform radial expansion of the working zone surface 217 during heating, the working zone surface 217 can maintain a substantially uniform radius across the length L of the working zone surface 217 throughout heating and cooling cycles of the forming roll 207.

The thermal resistance boundary may comprise a wide range of alternative configurations. For example, FIG. 4 illustrates a first thermal resistance boundary comprising a first frustoconical groove 407 and a second thermal resistance boundary comprising a second frustoconical groove 409. Each frustoconical groove 407, 409 can be defined in the forming roll 207 to extend at the respective acute angles α, β relative to the rotation axis 219 of the forming roll 207.

The frustoconical grooves 407, 409 can extend completely, partially, or intermittently around the circumference of the forming roll 207. For example, as shown, the frustoconical grooves 407, 409 each extend continuously and completely about the periphery of the forming roll 207. Providing one or both of the frustoconical grooves as a continuous frustoconical groove that extends completely about the periphery of the forming roll can provide a more efficient boundary to thermal conduction outside the working zone portion. One or both of the frustoconical grooves may alternatively comprise discontinuities, such as aligned groove segments that are spaced apart about the periphery of the forming roll 207. While the discontinuities may provide points of reduced thermal resistance, the discontinuities may provide structural integrity to the forming roll that may not otherwise be achieved by a continuous frustoconical groove.

As further illustrated in FIG. 4, the frustoconical grooves 407, 409 can extend a depth "d" into the working zone surface 217. Various depth ranges may be provided to provide a sufficient thermal resistance boundary while maintaining the structural integrity of the forming roll 207. For example, as shown, the forming roll can include a diameter "D" that is twice the radius "R" of the forming roll 207. The depth "d" of the frustoconical grooves 407, 409 can be within a range of from about 50% to about 85% of the radius "R" of the forming roll 207 although other depths may be provided in further examples.

As further shown in FIGS. 2-4, the roll forming apparatus 201 may also comprise a pair of gap rings 221, 223, wherein the forming roll 207 and the forming body 209 are spaced from each other by the pair of gap rings 221, 223 to define the glass forming gap 211. While the thermal resistant boundaries of the forming roll 207 and the forming body 209 are configured to maintain a substantially uniform width W along length L during radial expansion of the forming roll and forming body, the gap rings 221, 223 may be configured to maintain a substantially constant width W during this radial expansion. In the example shown in FIGS. 2-4, the gaps rings 221, 223 are mounted to the working zone portion 215 of the forming roll 207 and protrude from the working zone surface 217 by a distance X. In alternative examples, one or both of the gap rings 221, 223 may be mounted to a working portion 225 of the forming body 209 and protrude from a working zone surface 227 of the working portion 225 by a distance X. In further examples, as further shown by the gap rings 222, 224 in hidden lines in FIG. 2, both the forming roll 207 and the forming body 209 may each include a pair of gap rings that each extend from the corresponding working zone surface 217, 227 by a distance X/2. Respective gap rings 221, 222 and 223, 224 can engage one another in operation such that the total spacing of the working zone surfaces 217, 227 provided by the gap rings is X.

Thus, the pair of gap rings 221, 223 can ensure that, during expansion, the working zone surfaces 217, 227 of the forming roll 207 and the forming body 209 will remain separated by a constant width W that corresponds to the distance X. Accordingly, a pair of gap rings 221, 223 may be selected that protrude from the working zone surface 217 by a predetermined distance X to form a glass ribbon 213 having a substantially uniform thickness T that corresponds to the predetermined distance X. As such, thin glass ribbons with a uniform thickness of 1 mm or less can be easily formed without having to predict how the width W may change during the expansion of forming rolls absent the use of gap rings. Moreover, even though the gap rings 221, 223 may themselves expand as they rise in temperature during the roll forming process, the expansion of distance X should be nominal when distance X is small (as is the case when forming thin glass sheets of 1 mm or less). Furthermore, the gap rings 221, 223 may be coated with a low thermal conductivity ceramic coating or they may comprise a material having a low coefficient of thermal expansion to reduce the effects of heat on the expansion of distance X.

The pair of gaps rings 221, 223 may be integral with the forming roll 207 and/or forming body 209 or they may be mounted separately to the forming roll 207 and/or forming body 209. Additionally, as discussed above, there may be a second pair of gap rings (not shown) mounted to the forming body 209 that contact the first pair of gap rings 221, 223 on the forming roll 207. Moreover, although the example provided shows a pair of gaps rings 221, 223 mounted on the working zone portion 215 of forming roll 207, they can alternatively be mounted to the end portions 403, 405 of the forming roll 207. However, since the working zone portion 215 will retain heat from the stream of molten glass 205 and therefore expand at a rate different from (and greater than) the end portions 403, 405, mounting the gap rings 221, 223 on the working zone portions 215, 225 can lead to a better control of the width W along length L. In other words, mounting the gap rings 221, 223 to the end portions 403, 405 will ensure that the end portions 403, 405 remain a constant distance apart but may not ensure that the working zone surfaces 217, 227 will remain a constant distance apart since the working zone surfaces 217, 227 may expand at a rate different from the end portions 403, 405.

Figure 5:
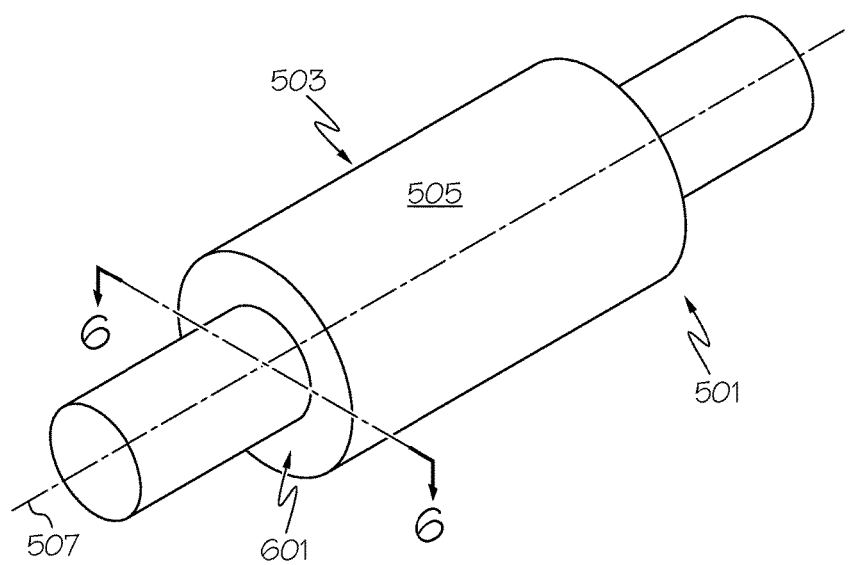
FIG. 5 is a perspective view of another example forming roll.
Figure 6:
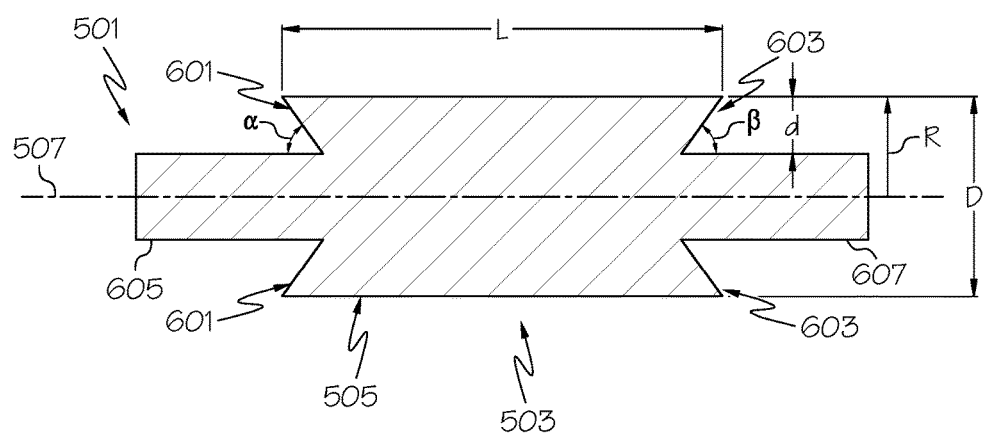
FIG. 6 is a cross-sectional view taken along line 6-6 of FIG. 5.

As shown in FIG. 4, each of the forming roll 207 and the forming body 209 may have a similar (such as the illustrated identical) thermal resistance boundary configuration. In fact, as discussed above, the forming body 209 may be identical to the forming roll 207 such that the forming roll 207 and the forming body 209 form a pair of substantially identical forming rolls as shown. One or both of the forming roll and forming body may have alternative constructions for the thermal resistance boundaries. For example, one or both of the forming roll 207 and/or the forming body 209 can comprise the forming roll 501 shown in FIGS. 5 and 6. The forming roll 501 comprises a working zone portion 503 comprising a working zone surface 505 for engaging the stream of molten glass 205. The working zone surface 505 including a length L extending along a rotation axis 507 of the forming roll 501. As shown in FIG. 6, the forming roll 501 includes a first thermal resistance boundary comprising a first frustoconical end surface 601 and a second thermal resistance boundary comprising a second frustoconical end surface 603. Each frustoconical end surface 601, 603 can extend at the respective acute angles α, β relative to the rotation axis 507 of the forming roll 501.

As further illustrated in FIG. 6, the frustoconical end surfaces 601, 603 can extend a depth "d" into the working zone surface 505. Various depth ranges may be provided to provide a sufficient thermal resistance boundary while maintaining the structural integrity of the forming roll 503. For example, as shown, the forming roll can include a diameter "D" that is twice the radius "R" of the forming roll 503. The depth "d" of the frustoconical end surface 601, 603 can be within a range of from about 50% to about 85% of the radius "R" of the forming roll 503 although other depths may be provided in further examples.

As shown in FIG. 6, the end surface 601, 603 do not face a corresponding surface of end portions 605, 607 of the forming roll 501. As such, the thermal resistance boundaries of FIGS. 5 and 6 may have a higher thermal resistance to heat transfer than the thermal resistance boundaries of FIGS. 2-4. Although not shown, the forming roll 501 may optionally include a plurality of strengthening ribs extending radially about the rotation axis 507 and spanning between the end surfaces 601, 603 and the respective end portions 605, 607 to increase the structural strength of the forming roll 501.

Figure 7:
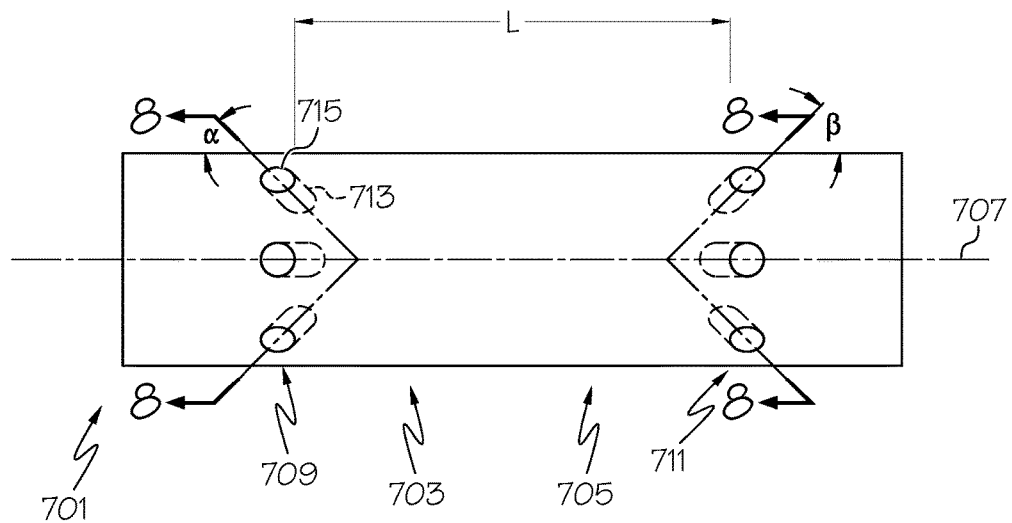
FIG. 7 is a side-view of yet another example forming roll.
Figure 8:
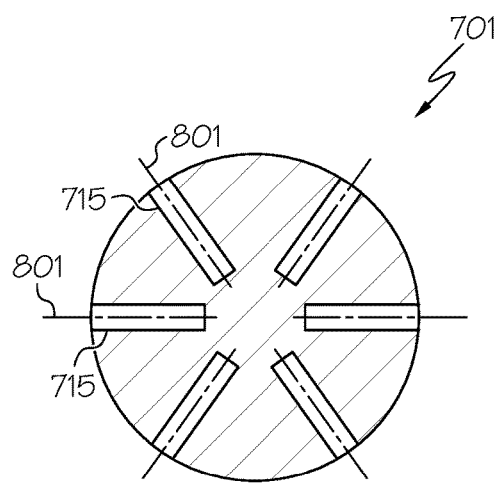
FIG. 8 is a cross-sectional view along frustoconical planes 8-8 of FIG. 7.

In further examples, one or both of the forming roll and forming body can comprise the forming roll 701 shown in FIGS. 7 and 8. The forming roll 701 comprises a working zone portion 703 comprising a working zone surface 705 for engaging the stream of molten glass 205. The working zone surface 705 including a length L extending along a rotation axis 707 of the forming roll 701. The forming roll 701 includes a first thermal resistance boundary comprising a first plurality of bores 709 and a second thermal resistance boundary comprising a second plurality of bores 711. As indicated by the hidden lines 713 of each bore 715, the bores can extend along a bore axis 801 (see FIG. 8) at the respective acute angles α, β relative to the rotation axis 707 of the forming roll 701 as indicated by frustoconical sectional planes 8-8. FIG. 8 illustrates the array of bores 715 radially spaced about the rotation axis 707 of the forming roll 701 along corresponding frustoconical planes 8-8 of FIG. 7. The bores 715 may or may not be equally spaced from each other. Additionally, the bores 715 may vary in number, depth, and size from the example shown. In these alternative embodiments, as each bore axis 801 extends at the respective acute angles α, β, the thermal resistant boundaries similarly extend at acute angles relative to the rotation axis of the forming roll 701. Providing the thermal resistance boundaries as respective pluralities of bores can provide enhanced structural integrity when compared to other designs that remove substantial portions of the forming roll to create the thermal resistance boundaries.

Figure 9:
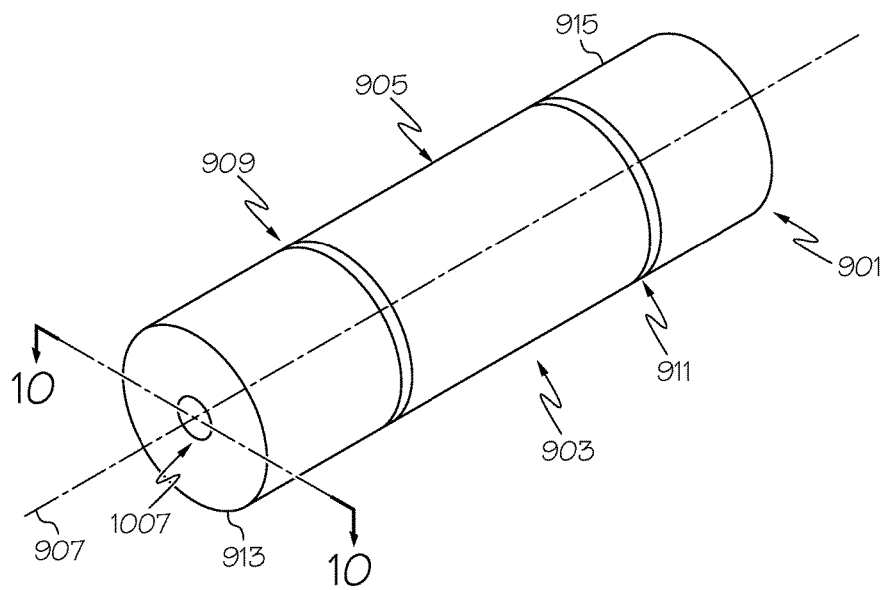
FIG. 9 is a perspective view still another example forming roll.
Figure 10:
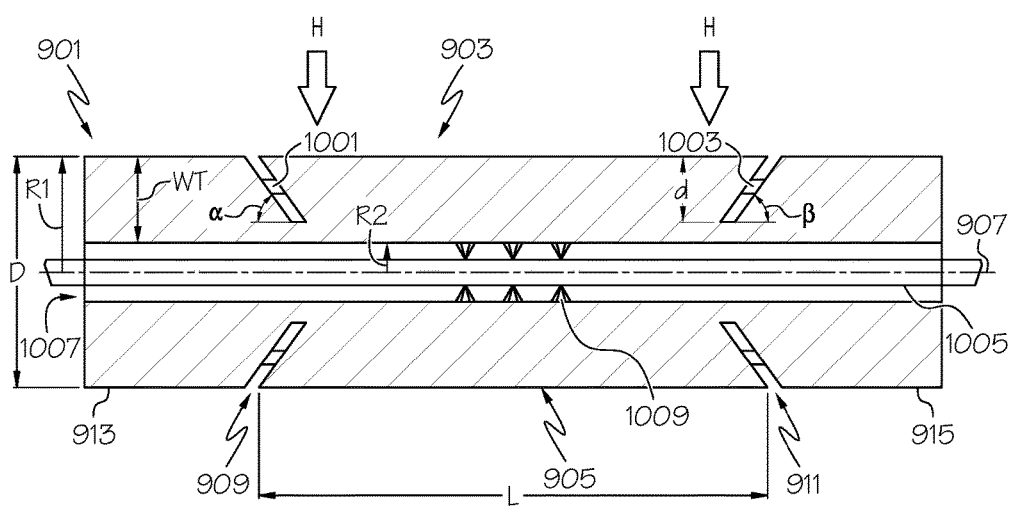
FIG. 10 is a cross-sectional view along line 10-10 of FIG. 9 showing the forming roll in use.

In still further examples, one or both of the forming roll and forming body can comprise the forming roll 901 shown in FIGS. 9 and 10. The forming roll 901 comprises a working zone portion 903 comprising a working zone surface 905 for engaging the stream of molten glass 205. The working zone surface 905 including a length L extending along a rotation axis 907 of the forming roll 901. The forming roll 901 includes a first thermal resistance boundary comprising a first frustoconical groove 909 and a second thermal resistance boundary comprising a second frustoconical groove 911. Each frustoconical groove 909, 911 can be defined in the forming roll 901 to extend at the previously described respective acute angles α, β relative to the rotation axis 907 of the forming roll 901. As with the frustoconical grooves 407, 409 illustrated in FIG. 4, the frustoconical grooves 909, 911 can extend completely, partially, or intermittently around the circumference of the forming roll 901. For example, as shown, the frustoconical grooves 909, 911 each extend completely about the periphery of the forming roll 901. Providing one or both of the frustoconical grooves as a frustoconical groove that extends completely about the periphery of the forming roll 901 can provide a more efficient boundary to thermal conduction outside the working zone portion.

Optionally, one or both of the frustoconical grooves may alternatively comprise discontinuities to increase the structural integrity of the forming roll that may not otherwise be achieved by the continuous frustoconical groove. For example, as shown in FIG. 10, each of the frustoconical grooves 909, 911 may include a plurality of strength elements, such as the illustrated weld points 1001, 1003, positioned within the groove to strengthen the forming roll 901. The weld points 1001, 1003 attach the working zone portion 903 to end portions 913, 915 of the forming roll 901, thus adding strength and rigidity to the forming roll 901. The weld points 1001, 1003 can extend completely or partially around the circumference of the forming roll 901. There can also be more than one weld point positioned within each groove. Moreover, the weld points 1001, 1003 can be positioned radially so that they are closer to the surface of the forming roll 901 or they can be positioned deeper within the grooves so that they are closer to the rotation axis of the forming roll 901.

The forming rolls of the disclosure may also include an optional cooling passage. For example, as shown in FIG. 10, the forming roll 901 includes an optional cooling passage 1007 configured to provide fluid cooling to the forming roll 901. In some examples, the cooling passage 1007 may be coaxial with the forming roll 901 and extends through the working zone portion 903. As further illustrated in FIG. 10, the frustocontical grooves 909, 911 can extend a depth "d" into the working zone surface 905. Various depth ranges may be provided to provide a sufficient thermal resistance boundary while maintaining the structural integrity of the forming roll 903. For example, as shown, the forming roll can include a diameter "D" that is twice the radius "R1" of the forming roll 903. Moreover, the cooling passage 1007 can include a radius "R2" wherein a wall thickness "WT" is formed between the working zone surface 905 and the interior wall surface of the cooling passage 1007. The depth "d" of the frustoconical grooves 909, 911 can be within a range of from about 50% to about 85% of the wall thickness "WT" of the forming roll 903 although other depths may be provided in further examples.

Cooling fluid may be supplied to this cooling passage 1007 an dispersed as a cooling fluid stream 1009 to cool the forming roll 901 and reduce its expansion during the roll forming process. The cooling fluid may be water or compressed air or some other cooling fluid. As shown in FIG. 10, a conduit 1005 may be provided within the cooling passage 1007 to deliver the cooling fluid and direct the cooling fluid stream 1009 against an internal central portion of the forming roll 901.

During the roll forming process, the central portion of the forming roll 901 experiences a greater amount of heat than the outer peripheral portions of the forming roll 901. Thus, by directing the cooling fluid towards the central portion of the forming roll 901, the temperature of the central portion can be controlled so that the central portion expands at a rate substantially uniform to outer peripheral portions of the working zone portion 903. Accordingly, directing the fluid stream 1009 against an internal central portion of the forming roll 901 can facilitate substantial uniform expansion of the working zone surface 905 across the length L of the working zone surface 905 in response to heating of the working zone portion 903 by the stream of molten glass 205.

In addition or in alternative to flowing a cooling fluid through a cooling passage, heat H may be directed to outer peripheral edges of the working zone portion 903 to facilitate substantial uniform expansion of the working zone surface 905 across the length L of the working zone surface 905 in response to heating of the working zone portion 903 by the molten glass, as shown in FIG. 10. By directing heat towards the outer peripheral edges of the working zone portion 903, the temperature of the outer peripheral portions can be controlled so that the outer peripheral portions expand at a rate substantially uniform to the central portion of the working zone portion 903.

Methods of forming the glass ribbon 213 will now be described and can apply to any of the example forming roll/forming body configurations of the disclosure. The method can be carried out with at least one forming roll and a forming body spaced to define a glass forming gap between the forming roll and forming body. As mentioned previously, the forming body can comprise various configurations and may be similar or identical to the forming roll. For example, as shown in FIGS. 2 and 4, both the forming roll 207 and the forming body 209 including working zone portions 215, 225 comprising the working zone surfaces 217, 227 including the length L extending along the rotation axis 219 of the corresponding forming roll 207 and forming body 209. As mentioned previously, the forming roll and forming body can each include the thermal resistance boundary comprising the frustoconical grooves 407, 409 defined in the forming roll 207 that each extend at the acute angle α, β relative to the respective rotation axis (e.g., rotation axis 219). The method can provide the acute angles α, β within a range of from about 30° to about 60° although other acute angles may be used in further examples.

As discussed previously, other thermal resistance boundary configurations may be used in further examples. For instance, FIGS. 5 and 6 illustrate the thermal resistance boundary comprising the frustoconical end surface 601, 603 of the working zone portion 503. FIGS. 7 and 8 illustrated another example wherein the thermal resistance boundary comprises the plurality of bores 709, 711 spaced radially about the rotation axis 707 of the forming roll. As shown in FIGS. 9 and 10, another examples provides the thermal resistance boundary as the frustoconical groove 909, 911 with the plurality of strength elements (e.g., weld points 1001, 1003) positioned within the groove.

Turning to FIGS. 2 and 3, the methods can further include the steps of supplying the stream of molten glass 205 and feeding the stream of molten glass through the gap 211 to form the glass ribbon 213 including the formed thickness T. The thermal resistance boundary of each example of the disclosure facilitates substantial uniform radial expansion of the working zone surface relative to the rotation axis across the length of the working zone surface in response to heating of the working zone portion by the molten glass. In one example, the method can further include the step of cooling the forming roll with a fluid. For instance, as shown in FIG. 10, the method can include flowing the fluid through the cooling passage 1007 extending along the rotation axis 907 of the forming roll 901. As further shown, the method can include the step of cooling by flowing the fluid against the internal central portion of the forming roll, for example, by way of the cooling fluid stream 1009. Flowing the fluid against the internal central portion of the forming roll can facilitate substantial uniform expansion of the working zone surface 905 across the length L of the working zone surface 905 in response to heating of the working zone portion 903 by the molten glass 205.

As further shown schematically by "H" in FIG. 10, the method can also include the step of heating the outer peripheral edges of the working zone portion 903 to facilitate substantial uniform expansion of the working zone surface 905 across the length L of the working zone surface 905 in response to heating of the working zone portion 903 by the molten glass 205.

It will be apparent to those skilled in the art that various modifications and variations can be made without departing from the spirit and scope of the claimed invention.

What is claimed is:
1. A method of forming a glass ribbon with at least one forming roll and a forming body spaced to define a glass forming gap between the forming roll and forming body, wherein the forming roll comprises a working zone portion comprising a working zone surface including a length extending along a rotation axis of the forming roll, wherein the working zone portion is defined by a first thermal resistance boundary extending at a first acute angle relative to the rotation axis of the forming roll and a second thermal resistance boundary extending at a second acute angle relative to the rotation axis of the forming roll, and the first acute angle and the second acute angle face away from one another in opposite directions of the rotation axis, the method comprising:

supplying a stream of molten glass; and feeding the stream of molten glass through the gap to form a glass ribbon including a formed thickness, wherein the first thermal resistance boundary and the second thermal resistance boundary facilitate substantial uniform radial expansion of the working zone surface relative to the rotation axis across the length of the working zone surface in response to heating of the working zone portion by the molten glass wherein the working zone portion comprises a circumferential dovetail portion that includes a trapezoidal cross-sectional portion flared in a radial direction extending away from the rotation axis of the forming roll, and the circumferential dovetail portion is defined by the first thermal resistance boundary and the second thermal resistance boundary.

2. The method of claim 1, wherein the working zone portion comprises a frustoconical end surface defined by the first thermal resistance boundary.

3. The method of claim 1, further comprising cooling the forming roll with a fluid.

4. The method of claim 3, wherein the cooling of the forming roll includes flowing the fluid through a cooling passage extending along the rotation axis of the forming roll.

5. The method of claim 3, wherein the cooling of the forming roll includes flowing the fluid against an internal central portion of the forming roll to facilitate substantial uniform expansion of the working zone surface across the length of the working zone surface in response to heating of the working zone portion by the molten glass.

6. The method of claim 1, further comprising directing heat to outer peripheral edges of the working zone portion to facilitate substantial uniform expansion of the working zone surface across the length of the working zone surface in response to heating of the working zone portion by the molten glass.

7. The method of claim 1, wherein the first acute angle is from about 30° to about 60°.

8. The method of claim 1, wherein the first thermal resistance boundary extends between the working zone surface and the rotation axis.

9. A method of forming a glass ribbon with at least one forming roll and a forming body spaced to define a glass forming gap between the forming roll and forming body, wherein the forming roll comprises a working zone portion comprising a working zone surface including a length extending along a rotation axis of the forming roll, wherein the working zone portion comprises a circumferential dovetail portion that includes a trapezoidal cross-sectional portion flared in a radial direction extending away from the rotation axis of the forming roll, and the circumferential dovetail portion is defined by a first thermal resistance boundary and a second thermal resistance boundary, the method comprising:

supplying a stream of molten glass; and feeding the stream of molten glass through the gap to form a glass ribbon including a formed thickness, wherein the first thermal resistance boundary and the second thermal resistance boundary facilitate substantial uniform radial expansion of the working zone surface relative to the rotation axis across the length of the working zone surface in response to heating of the working zone portion by the molten glass.

10. The method of claim 9, wherein the working zone portion comprises a frustoconical end surface defined by the first thermal resistance boundary.

11. The method of claim 9, further comprising cooling the forming roll with a fluid.

12. The method of claim 11, wherein the cooling of the forming roll includes flowing the fluid through a cooling passage extending along the rotation axis of the forming roll.

13. The method of claim 11, wherein the cooling of the forming roll includes flowing the fluid against an internal central portion of the forming roll to facilitate substantial uniform expansion of the working zone surface across the length of the working zone surface in response to heating of the working zone portion by the molten glass.

14. The method of claim 9, further comprising directing heat to outer peripheral edges of the working zone portion to facilitate substantial uniform expansion of the working zone surface across the length of the working zone surface in response to heating of the working zone portion by the molten glass.

15. The method of claim 9, wherein the first thermal resistance boundary extends at a first acute angle relative to the rotation axis of the forming roll.

16. The method of claim 15, wherein the first acute angle is from about 30° to about 60°.

17. The method of claim 9, wherein the first thermal resistance boundary extends between the working zone surface and the rotation axis.

* * * * *